UNITED STATES PATENT OFFICE.

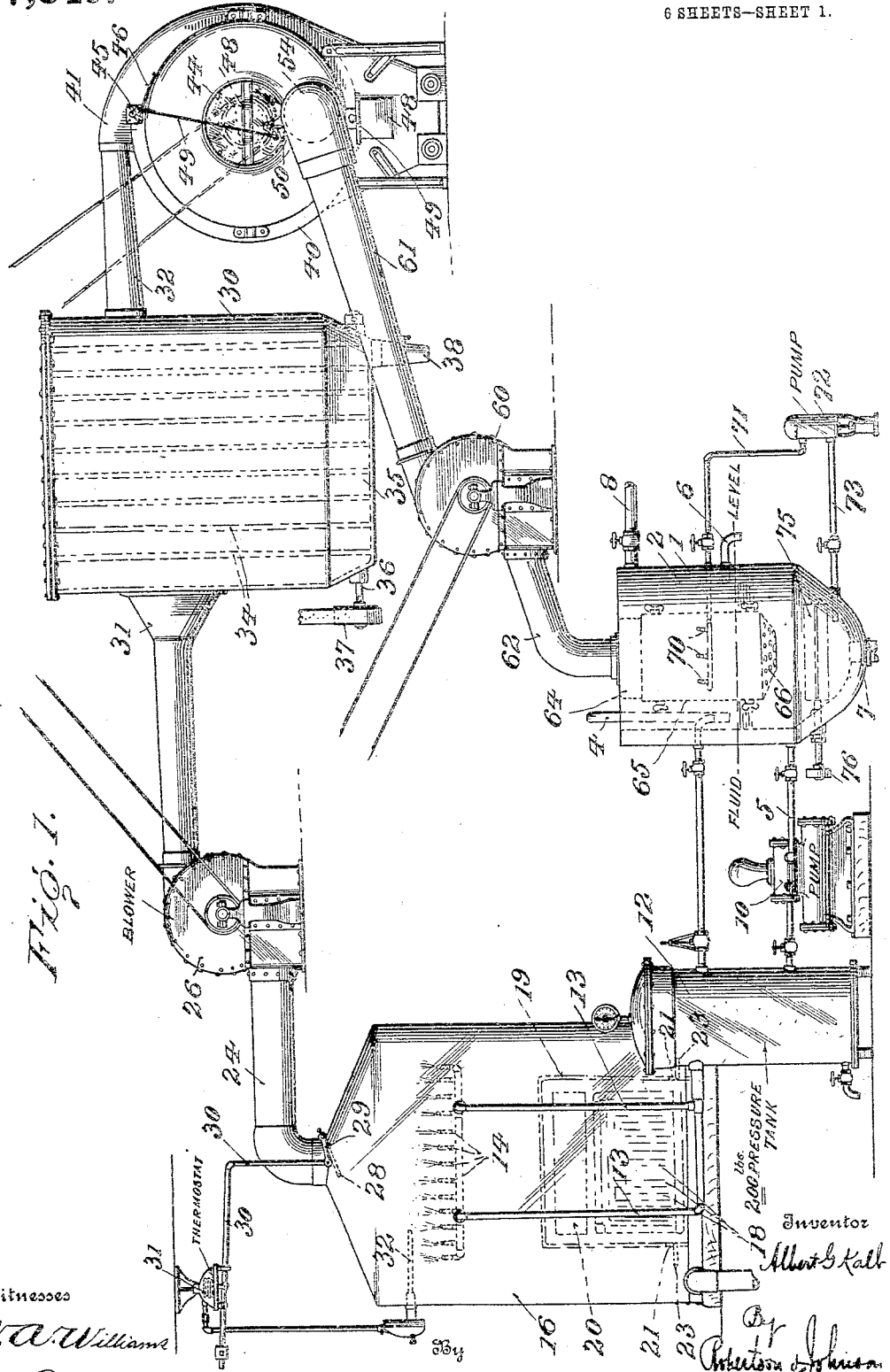

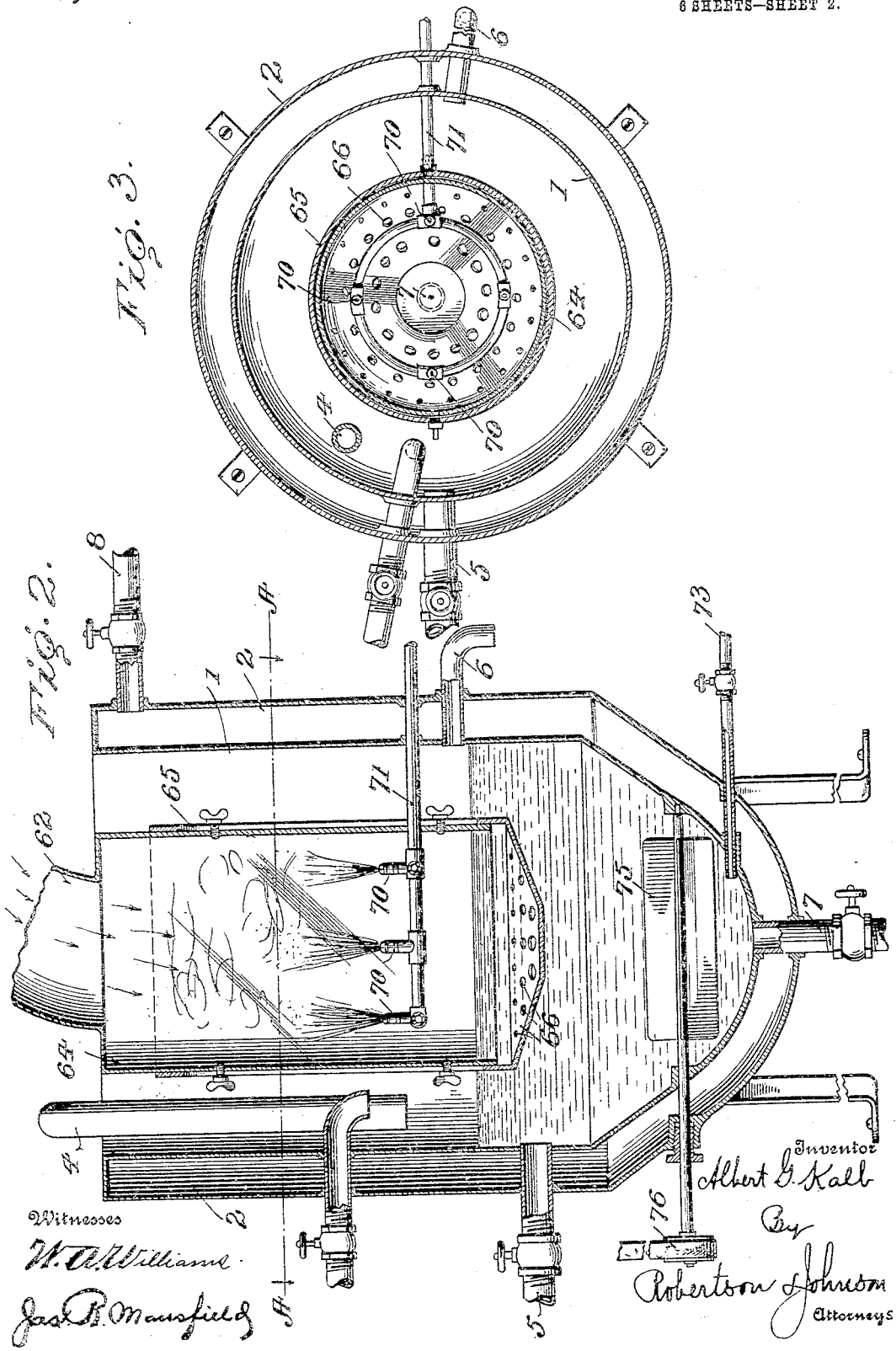

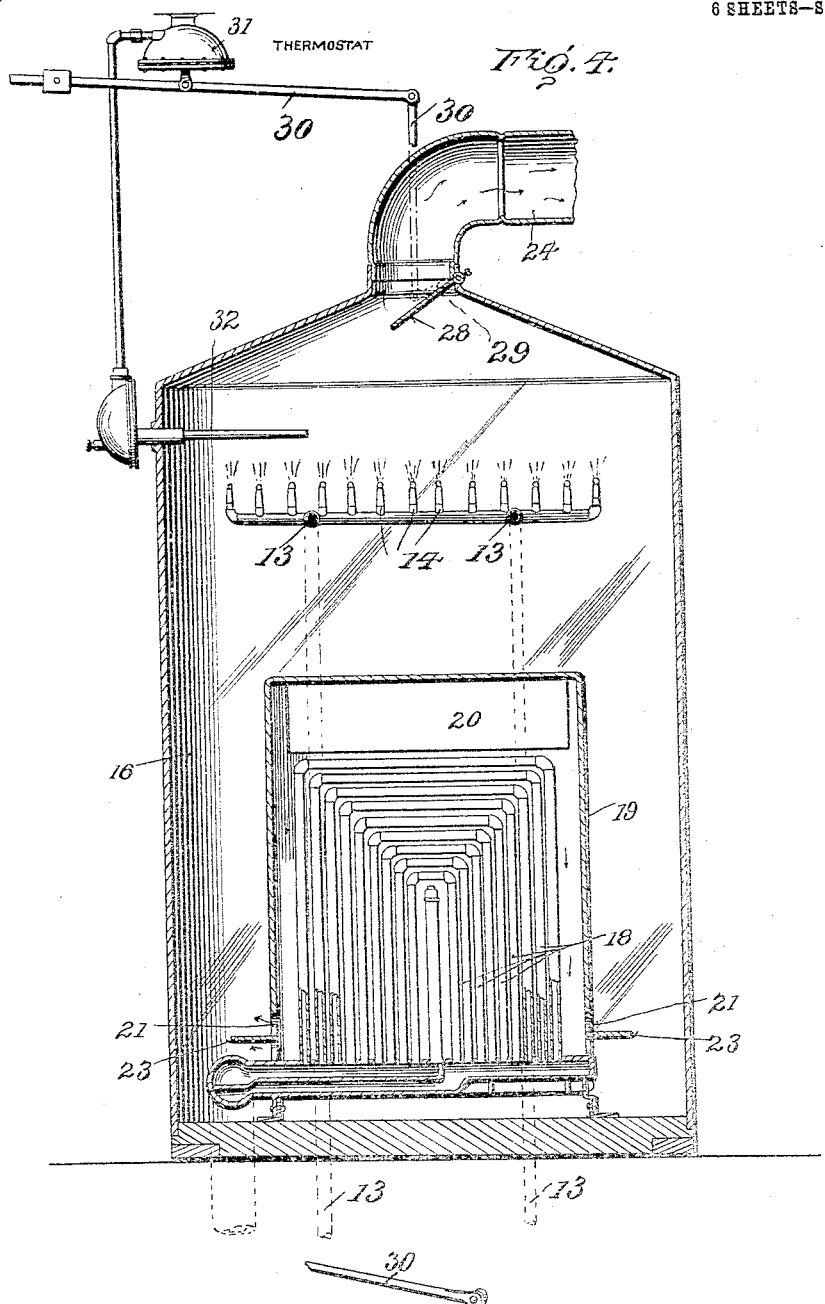

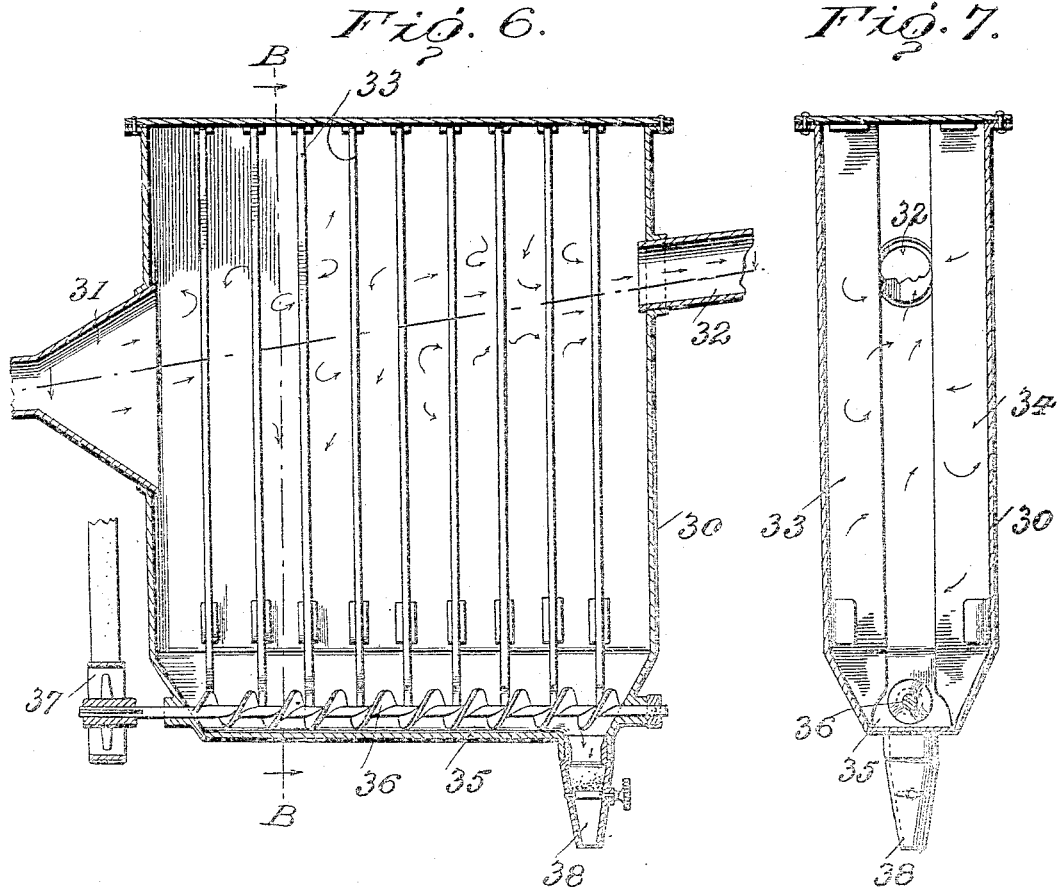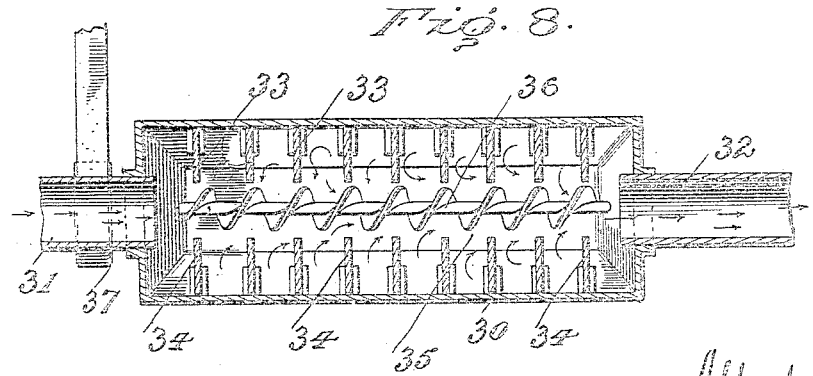

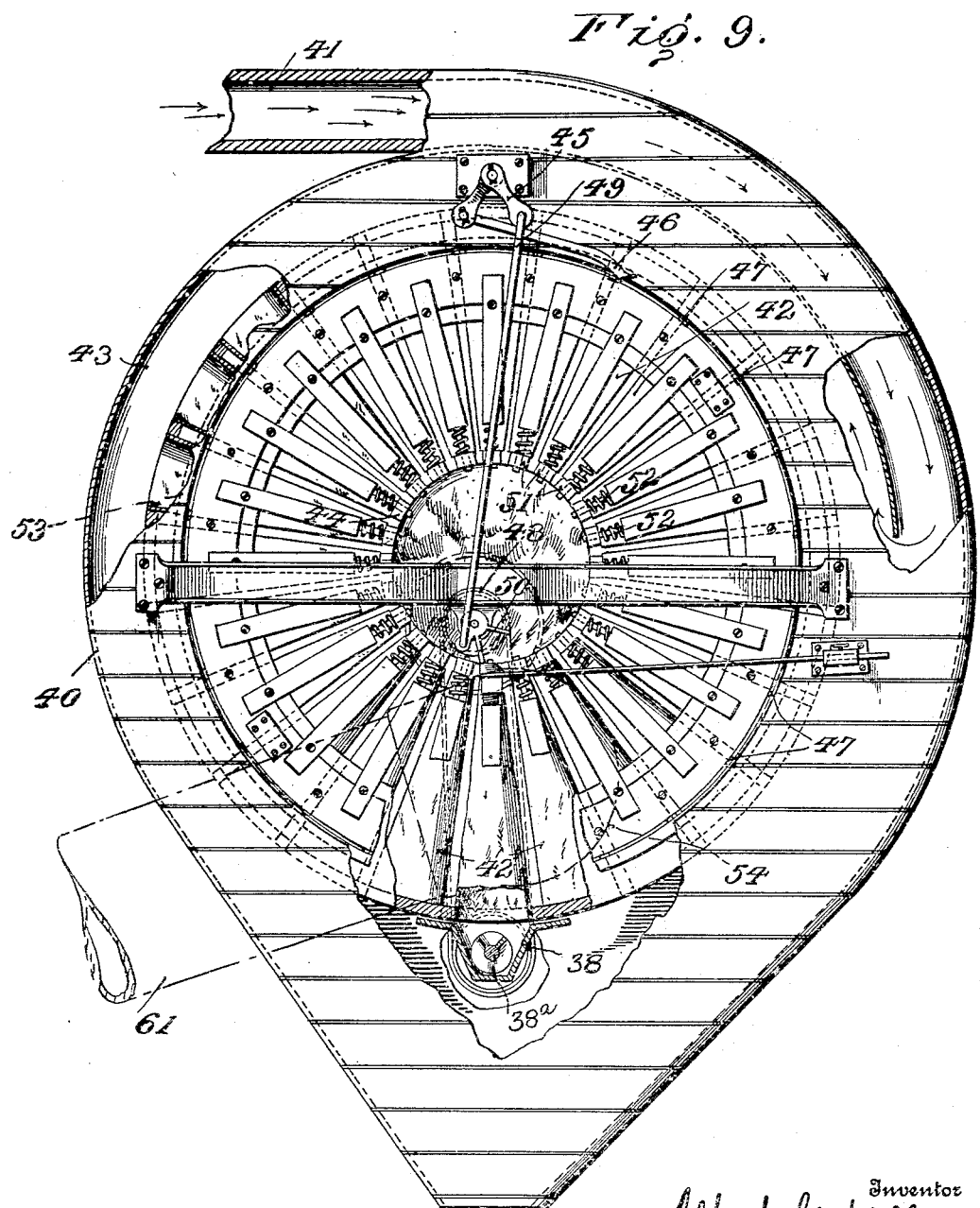

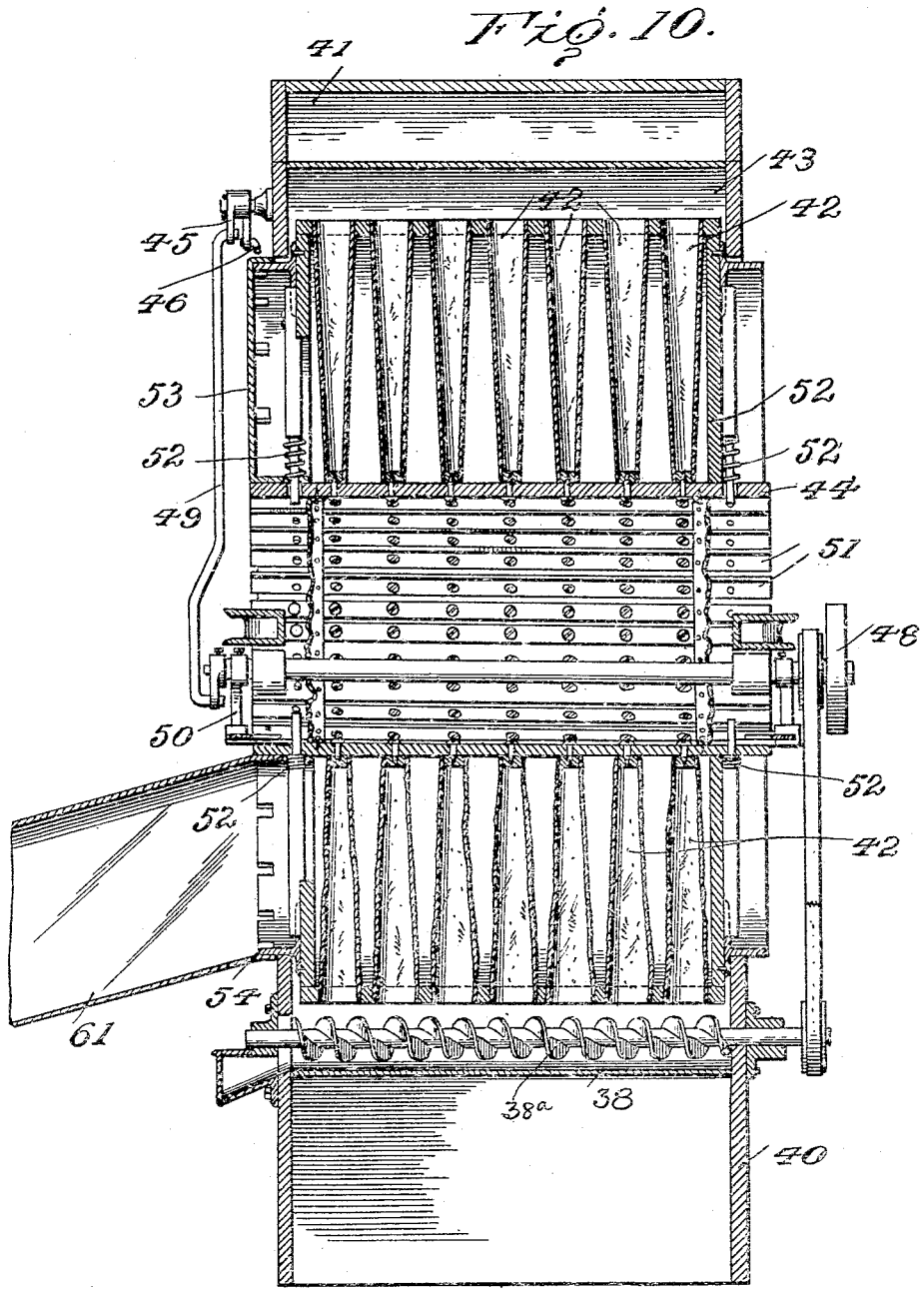

ALBERT G. KALB, OF CHICAGO, ILLINOIS, ASSIGNOR TO NATURAL DRY PRODUCTS COMPANY, OF AUGUSTA, MAINE, A CORPORATION OF MAINE.

DESICCATING FLUID SUBSTANCES.

957,849.

Specification of Letters Patent. Patented May 10, 1910.

Application filed July 30, 1908. Serial No. 446,170.

*To all whom it may concern:*

Be it known that I, ALBERT G. KALB, a citizen of the United States of America, and resident of Chicago, in the county of Cook and State of Illinois, have invented certain new and useful Improvements in Desiccating Fluid Substances, of which the following is a specification.

This invention relates to improvements in apparatus for desiccating fluid substances and more particularly to that class of inventions wherein the substances to be desiccated are introduced in a finely divided or atomized condition into a current or body of air, preferably warmed or dried, so that each particle of material will be exposed to the drying action of the air and will be almost immediately desiccated and reduced to a particle of solid material.

In the preferred form of my invention the material to be desiccated is contained in a suitable tank and from there it is pumped into a pressure tank from whence it is atomized into a desiccating chamber into which air is constantly introduced in large volume, the desiccated particles of milk thus being subjected to the drying action of the constantly maintained current of dry, warm air. A blower or other exhausting device exhausts the desiccated particles, together with the air which has taken up the moisture from such particles, from the desiccating chamber and forces them into a dust collector, preferably, yet not necessarily, of a centrifugal type. Most of the dried or desiccated particles are separated from the air in this dust collector and such separated particles are discharged by any desired means. The air from the dust collector, together with such particles as have not been separated therefrom, then pass into a further collector, preferably of rotary type, in which a still finer separation is made, and then the air and the small percentage of particles contained thereby is exhausted from this rotary collector and discharged into the tank in which the substances to be desiccated were originally contained. In this tank the air and its small percentage of valuable particles is subjected to a spray of the material being desiccated and this spray gathers as much of the remaining particles as possible from the air before the air is finally discharged to the atmosphere.

Generally speaking my invention consists of the apparatus shown in its preferable embodiment in the accompanying drawings and as will now be hereinafter described and claimed.

In the drawings accompanying and forming part hereof, and which it will be understood represent the preferable, though not necessary, form of my invention, Figure 1 is a view, mostly in side elevation, showing the complete apparatus for carrying out my process. Fig. 2 is a vertical central section of the tank for condensing the desiccated material before it is subjected to the atomizing process. Fig. 3 is a horizontal section through the line $a$—$a$ of Fig. 2. Fig. 4 is a vertical central section of the desiccating chamber. Fig. 5 is a detail of the damper shown in Fig. 4. Fig. 6 is a vertical longitudinal section of the first dust collector. Fig. 7 is a vertical transverse section of the collector shown in Fig. 6, through the line $b$—$b$. Fig. 8 is a horizontal section of the collector shown in Fig. 6. Fig. 9 is a side elevation, partly in section of the rotary collector shown in Fig. 1. Fig. 10 is a vertical central section of the collector shown in Fig. 9.

Referring now to the details of the drawings by numerals: 1 designates a tank which is preferably provided with a water or steam jacket 2 for heating the material contained within the aforesaid tank. This tank is provided with a supply pipe 4 by which material may be placed in the tank and also with an exit pipe 5 by which the material is delivered to the desiccating chamber. An overflow 6 and a drain 7 are also provided and if steam is supplied and used as a heating medium a steam connection 8 is also employed. Within this tank is also provided a spraying device and on the exterior of the tank a pump is employed to operate this spraying device, but said features will be hereinafter described in detail.

The pipe 5 which has been mentioned as connecting with the tank 1, connects said tank with a pump 10 which forces the fluid material into a liquid pressure tank 12 and the object of this tank is to keep the liquid at a suitable pressure, say 200 pounds, so as to deliver the same through pipes 13 to a series of atomizers 14 placed within a desiccating chamber 16. Within this chamber is arranged a heating coil 18 and this coil is contained within a jacket 19 to which air is fed from the exterior through an inlet 20 and the air before entering the desiccating chamber 16 must surround the coils of the heater 18 and pass out of the openings 21 of the jacket 19 into the desiccating chamber 16, suitable deflectors or baffles 23 being provided at the openings 21.

The desiccating chamber 16 is provided with an outlet 24 which connects with a blower 26 so that the air is exhausted by this blower from the desiccating chamber 16 and inasmuch as the only entrance to this chamber is the air inlet 20 which feeds the air to the heater 18, it follows that the air which is exhausted from said heater must be first pre-heated or dried by the heater 18. It is desirable to maintain the temperature of the air at about 120° F. and in order to maintain this temperature I employ a damper 28 which is connected by the crank 29 (Fig. 5) and rods 30 to a thermostat 31 controlled by an expansion tube 32 entering the upper portion of the desiccating chamber. Nothing new is claimed in the details of this thermostatic damper and any of the usual thermostatic dampers may be employed.

The action of the apparatus so far described is to introduce the substance to be desiccated in a finely divided or atomized condition to a constantly supplied current of dry air introduced into the desiccating chamber and exhausted therefrom by means of the aforesaid blower 26, the blower thus maintaining a constant supply of dry air in great volume in the desiccating chamber and as finely divided or atomized particles are subjected to this constantly supplied large volume of air, said atomized particles are so exposed to the drying action of the air that they are almost immediately desiccated and reduced to particles of solid material; the liquid of the material being absorbed by the large volume of constantly supplied dry air and the whole being drawn from the desiccating chamber, as stated, by the exhauster 26. From the exhauster 26 the moisture laden air, together with the finely divided and dried or desiccated particles of solid material, are now forced into the dust collector shown more particularly in Figs. 6, 7 and 8. This dust collector, though shown in rectangular shape in my drawings, is practically centrifugal in its action as will be explained and comprises a casing 30 having an inlet 31 connected with the exhauster 26 and an exit 32 which leads to a second collector to be hereinafter described. The casing 30 is provided with a series of vertical partitions 33 and 34 which extend from the top to the bottom of the collector; the said bottom being formed into the shape of a trough 35 in which is located a conveyer 36, operated from the pulley 37, arranged to discharge the desiccated particles out through the discharge spout 38. The vertical partitions 33, as will be noticed particularly from Figs. 7 and 8 do not extend clear across the dust collector but leave a passage across the dust collector, between said partitions, from the inlet 31 to the exit 32. The action of this dust collector is to receive the dust laden air from the exhauster 26 and as said dust laden air is forced through the dust collector from the inlet 31 to the exit 32 the air strikes against the vertical partitions 33 and 34 and forms whirling eddies between said partitions, thus giving the solid particles a chance to settle and fall down into the trough 35 to be carried away by the conveyer 36. The air continues its motion and is discharged out of the exit 32. It will be observed that as the air is forced through the collector and strikes the vertical partitions and is whirled into eddies, this dust collector is practically centrifugal in its action.

From the exit 32 the dust laden air is carried to a rotary dust collector shown in detail in Figs. 9 and 10. This collector comprises an outer casing 40 with an inlet 41 which is connected to the exit 32 of the first dust collector as shown in Fig. 1, and this collector may be, generally speaking, of any desired form except as will be particularly described.

As shown in my drawings I have adapted the dust collector such as shown in U. S. Patent No. 711,760 and the details of this collector will need no further description other than to point out the features necessary for the operation of my method and apparatus. As shown in my drawings this collector comprises a series of radially disposed dust collecting tubes 42 which are arranged upon a rotary carrier 44 and given a step by step movement by means of the bell crank lever 45 and its hooked pawl 46 coacting with the slats 47 on the carrier; the bell crank 45 being operated from the pulley 48 by means of the rod 49 all as shown in the aforesaid patent. And as in said patent all of the said radially disposed collecting tubes 42, except the one which happens to be at the bottom, are connected with the main air trunk 43 to which the air is delivered by the inlet 41. As each dust collecting tube 42 reaches the bottom, its open end is located over the dust collecting trough 38, in which is located a conveyer 38ª to convey away the collected particles, and the said tube is given a vibratory action by means of the knocker arms 50 contacting with the bars 51 to give them a shaking action against the action of the springs 52. All the parts hereinbefore described are the same as in said Patent No. 711,760, and, as there shown, as the dust enters the inlet 41 it passes around into the main air trunk 43 and into the radially disposed collecting tubes 42. As these tubes rotate, and as each set of tubes reaches a place where it is vertically disposed over the trough 38 the tubes are given a rapid shaking action and any material collected therein is caused to settle by gravity into the trough 38 and conveyed away by the conveyer 38ª. In order to connect this rotary dust collector with the rest of my apparatus I entirely close the machine at the rear end by a closure 52 and the front end is similarly closed by a closure 53 which however is formed with an outlet 54 which connects with an air trunk 61.

The action of the rotary dust collector is controlled by means of a blower 60 shown in Fig. 1, this blower exhausting the air from the rotary collector through the aforesaid trunk 61 and delivering the air through a trunk 62 to a spraying chamber comprising two telescopic members 64 and 65, although the chamber need not be made telescopically unless desired. This spraying chamber is shown on the larger scale in Figs. 2 and 3 and as there shown the lower member 65 is provided with a perforated bottom which enters the tank 1 hereinbefore described and in the practical operation of this spraying chamber the lower perforated end of the telescopic member 65 is immersed in the fluid substance to be desiccated so that the air which is forced from the blower 60 into the spraying chamber needs to pass through the liquid to be desiccated and thus has to pass through the perforations 66 and then up through the liquid in the tank 1 to the atmosphere, the said tank 1 being open at the top as illustrated. The aforesaid spraying chamber contains a series of spraying or atomizing devices 70 and these are connected by a pipe 71 with a pump 72 the inlet of which is connected by a pipe 73 to the bottom of the tank 1; in operation the pump 72 forces the liquid from the tank 1 through the pipe 71 to the spraying or atomizing device where the sprayed or atomized particles of material to be desiccated are sprayed or atomized into the incoming air from the blower 60 and the finely divided particles thus tend to collect any of the dried particles there may still be remaining in the air which is forced into the spraying chamber. The result of this process is that by the time the air from the desiccating chamber 16 is forced through the two dust collectors and finally subjected to the spraying action in the spraying chamber 64 and then forced to pass out through the liquid in the tank 1, very little, if any, of the material to be desiccated is lost in the discharge of the air.

Within the bottom of the tank 1 is located a stirring or agitating device 75 which is operated from a pulley 76, the action of this device being to create a slight current in the liquid by drawing said liquid from the top down one side of the chamber permitting it to flow up the other side thus causing it to be maintained at a uniform consistency.

The operation of my invention is as follows: Supposing milk to be the substance to be desiccated, the milk is supplied through the supply pipe 4 to the tank 1 and is forced by the pump 10 into the pressure tank 12 where it is maintained at a pressure of say 200 pounds and then the milk passes through the feed pipes 13 to the series of atomizers 14 located in the desiccating chamber 16. A constant current of warm, dry air is maintained in this chamber 16 owing to the action of the blower 26 which draws the air in said chamber through the air inlet 20 where it is dried and slightly warmed, the thermostatic damper regulating the air so that it is maintained at a uniform temperature of about 120°. Thus the milk is atomized in the desiccating chamber 16 and subjected to the drying action of the constantly supplied warm dry air in sufficient volume to take up the moisture from the milk particles thus immediately desiccating and reducing said milk to particles of solid material. The air carrying the moisture and the solid particles is then drawn by the blower 26 and forced into the centrifugal dust collector where it attempts to find an outlet but in so doing passes through the extreme length of said dust collector and strikes against the vertical partitions 33 and 34 and is whirled into eddies so that the fine particles of milk are separated from the air and are permitted to fall into the trough 35 where they are removed by the conveyer 36. The air which escapes from the dust collector with any of its remaining particles is now drawn into the rotary dust collector by means of the exhauster or blower 60. In going through this rotary collector, the dust laden air passes into the main air chamber 48 and from thence into all of the radially disposed dust collecting tubes 42 and as these tubes, one at a time as they are given a step by step movement, reach the place where they are immediately over the trough 38, they are agitated so as to cause any particles of milk to settle into the trough and be carried away by the conveyer 38ª. The air is then sucked through these radially disposed collecting tubes and out through the trunk 61 into the blower 60 from which it is forced through the trunk 62 into the spraying chamber where it is subjected to the action of a fine spray of milk which is forced by the pump 72 through the spraying devices 70. Thus the air, with the few milk particles remaining in it, after passing through the two dust collectors, is subjected to this milk spray and then is caused to pass through the perforations in the bottom of the spraying chamber up through the milk in the tank 1 and to the atmosphere where it escapes.

From the foregoing and accompanying drawings, it will be seen that I have produced an apparatus which desiccates milk by a continuous method and discharges the air after practically all of the desiccated particles are collected therefrom.

It is obvious that modifications may be made in my apparatus without departing from the spirit of my invention, the scope of which is set forth by the appended claims.

What I claim as new is:

1. In apparatus for desiccating fluid substances, means for forming a current of air and maintaining said air in motion by constantly renewing the same, means for spraying the air with the fluid being treated, means for collecting part of the desiccated material, means for spraying the air and the residue of the particles carried by it, and means for forcing said sprayed air through the fluid being treated substantially as described.

2. In apparatus for desiccating fluid substances, means for forming a current of air, means for introducing the material being treated into the air in atomized condition, means for separating the bulk of the desiccated material from the air, and means for subsequently introducing a liquid spray to collect the residue of the desiccated material from the air, and means for forcing the air after being sprayed through the fluid being treated, substantially as described.

3. In apparatus for desiccating fluid substances, means for forming a current of air, means for atomizing and spraying said air with the fluid being treated, means for separating the bulk of the desiccated material from the air, a spraying chamber and means for forcing the air and contained material into said spraying chamber and through the fluid being treated, and means for spraying the air previous to its passage through the fluid being treated by a spray of said fluid substantially as described.

4. In apparatus for desiccating fluid substances, the combination of a chamber, means for creating a current of air therein, means for introducing the fluid in atomized condition to said air current and for constantly renewing the air, means for separating the desiccated material from the air comprising a dust collector having a series of vertical partitions past which the air is forced and part of the material thereby collected, a spraying chamber, and means for forcing the air from said dust collector through said spraying chamber, substantially as described.

5. In apparatus for desiccating fluid substances, the combination of a chamber, means for creating a current of air therein, a heating or drying device for said air, means for introducing the fluid in atomized condition to said air current, means for separating the desiccated material from the air comprising a dust collector having a series of vertical partitions past which the air is forced and part of the material thereby collected, a chamber having means for spraying material therein, and means for forcing the air from said dust collector through said spraying chamber, substantially as described.

6. In apparatus for desiccating fluid substances, the combination of a chamber, means for creating a current of air therein, means for introducing the fluid in atomized condition to said air current and for constantly renewing the air, means for separating the desiccated material from the air comprising a dust collector having a series of vertical partitions past which the air is forced and part of the material thereby collected, a spraying chamber, means for forcing the air from said collector through said spraying chamber, and means for spraying the dust-laden air in said spraying chamber, previous to forcing the air through the material, substantially as described.

7. In apparatus for desiccating fluid substances, the combination of a chamber, means for creating a current of air therein, means for introducing the fluid in atomized condition to said air current and for constantly renewing the air, means for separating the desiccated material from the air comprising a dust collector having a series of vertical partitions past which the air is forced and part of the material thereby collected, a rotary collector for collecting more of the material from said air, a chamber having means for spraying material therein, and means for forcing the air from said dust collector through said spraying chamber, substantially as described.

8. In apparatus for desiccating fluid substances, the combination of a chamber, means for creating a current of air therein, means for introducing the fluid in atomized condition to said air current, means for separating the desiccated material from the air comprising a dust collector having a series of vertical partitions past which the air is forced and part of the material thereby collected, a chamber having means for spraying material therein, means for forcing the air from said dust collector through said spraying chamber and through the material being treated, and means for spraying the air with the material being treated, previous to the passage of the air through said material, substantially as described.

9. In apparatus for desiccating fluid substances, the combination of a chamber, means for creating a current of air therein, means for introducing the fluid in atomized condition to said current, means for separating the desiccated material from the air comprising a dust collector having a series of vertical partitions past which the air is forced and part of the material thereby collected, a rotary collector comprising a series of radial tubes into which the dust laden air is forced, a spraying chamber, and means for drawing the air from said radial tubes and forcing it into said spraying chamber, substantially as described.

10. In apparatus for desiccating fluid substances, the combination of a chamber, means for creating a current of air therein, means for introducing the fluid in atomized condition to said air current, means for separating the desiccated material from the air comprising a dust collector having a series of vertical partitions past which the air is forced and part of the material thereby collected, a rotary collector comprising a series of radial tubes into which the dust laden air is forced, a spraying chamber, means for drawing the air from said radial tubes and forcing it into said spraying chamber, means for spraying said air in said spraying chamber, and means for forcing said sprayed air through the material being treated, substantially as described.

11. In apparatus for desiccating fluid substances, the combination of a chamber, means for creating a current of air therein and for maintaining said current by constantly renewing the air, means for drying or heating the air introduced to said chamber, means for introducing the fluid in atomized condition to said air current, a dust collector connected with said chamber and having a series of vertical partitions past which the air is forced and part of the desiccated material thereby collected, a rotary collector comprising a series of tubes into which the dust laden air is forced, a spraying chamber, means for drawing the air from said radial tubes and forcing it into said spraying chamber, a tank containing the material being treated into which said spraying chamber projects, a pump for forcing the material from said tank and spraying it in said chamber and thereby spraying the air, and means for forcing the sprayed air through the material being treated, substantially as described.

Signed by me at Chicago, Illinois this 28th day of July 1908.

ALBERT G. KALB.

Witnesses:
  BERT. E. NEIL,
  WM. J. NEIL.